(12) United States Patent
Weymans (10) Patent No.: US 7,796,614 B1
(45) Date of Patent: Sep. 14, 2010

(54) SYSTEMS AND METHODS FOR MESSAGE PROXYING

(75) Inventor: David Weymans, Plantation, FL (US)

(73) Assignee: Symantec Corporation, Cupertino, CA (US)

( * ) Notice: Subject to any disclaimer, the term of this patent is extended or adjusted under 35 U.S.C. 154(b) by 1160 days.

(21) Appl. No.: 11/001,276

(22) Filed: Nov. 30, 2004

(51) Int. Cl.
*H04L 12/56* (2006.01)

(52) U.S. Cl. .................. 370/396; 370/395.4; 370/395.54

(58) Field of Classification Search .................. 370/389, 370/390, 392, 397, 399, 395.3, 395.54
See application file for complete search history.

(56) References Cited

U.S. PATENT DOCUMENTS

| | | | | |
|---|---|---|---|---|
| 5,828,844 | A * | 10/1998 | Civanlar et al. | 709/228 |
| 2002/0080800 | A1 * | 6/2002 | Lee et al. | 370/395.54 |
| 2004/0120268 | A1 * | 6/2004 | Lobbert | 370/254 |
| 2004/0225725 | A1 * | 11/2004 | Enomoto et al. | 709/220 |
| 2005/0050365 | A1 * | 3/2005 | Seki et al. | 713/201 |
| 2005/0097357 | A1 * | 5/2005 | Smith | 713/201 |
| 2005/0105524 | A1 * | 5/2005 | Stevens et al. | 370/389 |
| 2005/0198383 | A1 * | 9/2005 | Rose et al. | 709/245 |
| 2005/0286515 | A1 * | 12/2005 | Cheshire | 370/389 |
| 2006/0007939 | A1 * | 1/2006 | Elangovan | 370/395.53 |

* cited by examiner

*Primary Examiner*—Jayanti K Patel
*Assistant Examiner*—Bo Hui A Zhu
(74) *Attorney, Agent, or Firm*—Finnegan, Henderson, Farabow, Garrett & Dunner, LLP (57) ABSTRACT

Systems and methods consistent with embodiments of the present invention provide a method for forwarding packets between VLAN groups served by segmented ports on a network switching device. A request from a source in a VLAN group to a destination in another VLAN group is identified. Information needed to route packets to the destination is obtained by re-broadcasting the request for destination information to all VLAN groups, which do not include the source, that are served by the network switching device. Information needed to route packets to the source is also obtained. In some embodiments, source and destination routing information obtained, is stored in tables in a memory cache on the network switching device. Information stored in the tables is used to relay additional packets between the segmented ports on the device serving the source and destination.

50 Claims, 7 Drawing Sheets

SYSTEMS AND METHODS FOR MESSAGE PROXYING

BACKGROUND

1. Field of the Invention

The present invention relates to the field of data transmission and communication and in particular, to systems and methods for the securely proxying data over computer networks.

2. Description of Related Art

It is almost routine for computers today to be connected to other computers by means of a network. Networks allow computers to communicate with each other and with other network elements and devices. Networking allows computers to share resources such as files and printers, and increase the overall reliability and availability of a computer system. A Local Area Network ("LAN") may connect computers ("hosts") located in close physical proximity, such as in a building. On the other hand, a Wide Area Network ("WAN") connects computer systems that are geographically remote. In some situations, it may be more convenient to group hosts by means of a logical relationship for example, by department, type of user, or primary application. A Virtual LAN ("VLAN") is a group of PCs, servers, and other network resources that behave as if they were connected to a single network segment. Hosts belonging to a VLAN appear to be on the same LAN, regardless of their actual physical location.

VLANs are useful in organizations in which users move between units, or the organizational structure allows members of a work unit to be located in different physical locations. VLANs let dispersed unit members share common resources, and be part of a single broadcast domain, so that traffic generated by users in a unit stays confined to that unit. If users are highly mobile and move between offices, the network administrator can use VLAN techniques to keep users within a broadcast group no matter where they connect to the network.

A network administrator can define several VLANs and restrict access to each VLAN to prevent users from accessing unauthorized resources. VLANs also provide a security benefit by limiting potential damage from a rogue or compromised host since the compromised host can only reach the remainder of the VLAN; hosts elsewhere on the network are essentially invisible.

There are a number of different methods for implementing VLANs. The simplest method is to define VLAN membership by groups of ports on a switch. For example, ports on a switch may be grouped to form a VLAN and segmented from other ports that do not belong to the VLAN. This concept can be extended to allow the VLAN to span multiple switches, so that a VLAN group is then defined by a switch/port identifier. Division of the ports into individual VLAN groups requires a switch capable of port configuration. Typically, programming individual ports is commonly supported in VLAN capable chips. This capability allows software to configure the ports on a switch into groups selected by a user or using a predefined allocation. Another approach is to define VLAN memberships based on Medium Access Control ("MAC") addresses. Since MAC addresses are hard coded into a host's network interface card ("NIC"), VLANs based on MAC addresses allow end-stations to be plugged into different physical locations on the network while retaining their VLAN group membership.

In both approaches discussed above, communication between port groups on a single switch requires data from one port group to be sent out of the device to an external router, which then forwards the data to the other port group. In certain environments the use, configuration and management, and expense of external routers to allow communication between groups is neither feasible nor practical. Thus, small standalone network switches are preferred for these environments. While such switches may provide the capability to create VLAN groups, they offer no support for communication between the groups because packets are never routed from LAN to LAN. Switches generally route data packets from the LAN to WAN or WAN to LAN. There is no mechanism for routing packets received on a LAN back to a LAN, which is required if the VLAN groups are to communicate. In addition, for security reasons, such devices must also be capable of restricting and controlling the types of packets that may be communicated between port groups. Therefore, there is a need for a system and a method to support communication across VLAN groups in a secure manner, without the use of routers and through the switch device itself.

SUMMARY

In some methods for forwarding packets between VLAN groups served by segmented ports on a network switching device, a request from a source served by the network switching device to a destination served by the network switching device is identified. In some embodiments, this request may be an Address Resolution Protocol ("ARP") request, or an equivalent. In some embodiments, if it is determined that the source of the request is served by a port that is segmented from the port serving the destination, then information needed to route packets to the destination is obtained by broadcasting a request for the needed destination information to other VLAN groups. In some embodiments, an ARP request corresponding to the original request from the source may be broadcast to other VLAN groups by the network switching device to obtain destination routing information. Information needed to route packets to the source is also obtained. In some embodiments, routing information for the source may be obtained from information contained in the original request sent by the source. In some embodiments, the obtained source and destination routing information is stored in tables. In some embodiments, the tables may reside in a memory cache on the network switching device. Information stored in the tables is used to relay additional packets between the segmented ports on the device serving the source and destination.

DETAILED DESCRIPTION

Modern computer networks are generally organized as a series of layers that are "stacked" on top of one another. Each layer provides services to the layers above it through a well-defined interface, while abstracting away the implementation details of the services it provides. Although communicating processes at the same hierarchy level ("peer processes") on different hosts may appear to be directly communicating with each other, the communication actually involves processes at lower layers until the lowest or "physical" layer, transmits the information over the physical medium through which actual communication occurs. At the receiving host, the information works its way up through the layers starting from the physical layer, until it reaches the level of the peer process. Communication between the peer processes themselves is governed by defined protocols. For example, the Transmission Control Protocol/Internet Protocol ("TCP/IP") is a combined set of protocols that performs the transfer of data between two computers and is used to connect hosts on the Internet.

Figure 1:
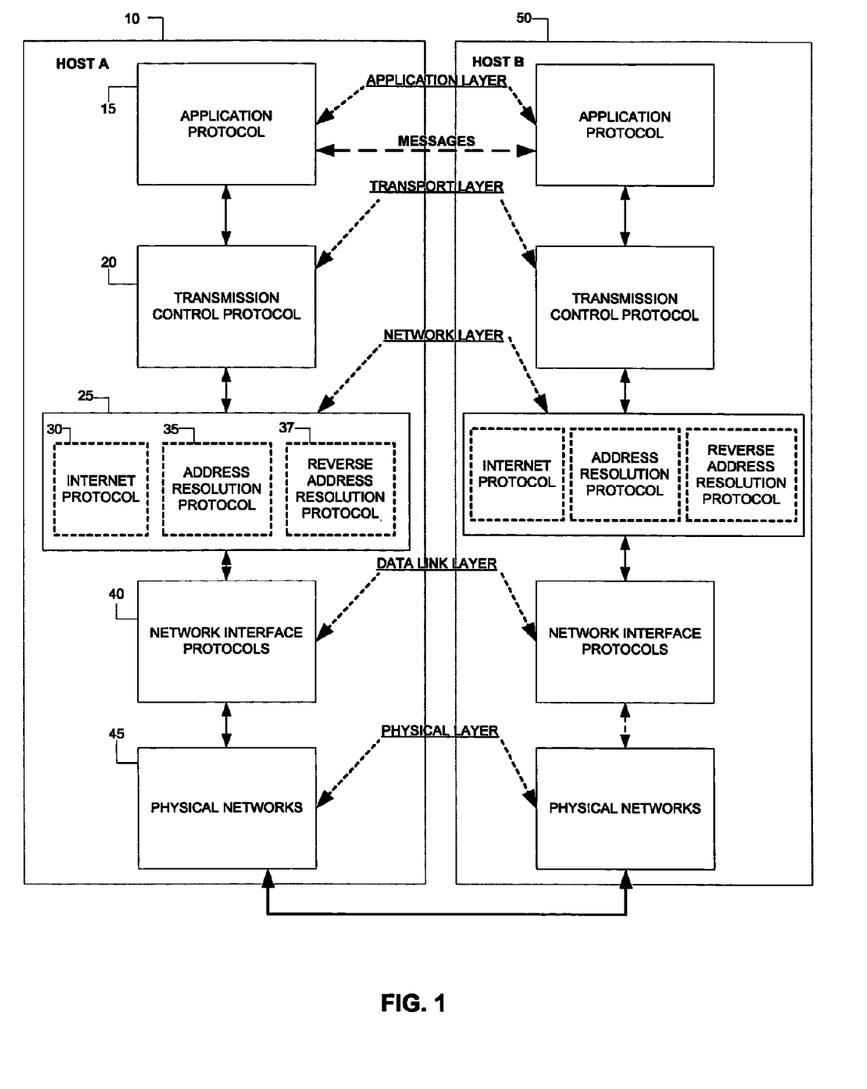
FIG. 1 illustrates communication between two hosts using the TCP/IP protocol stack.

FIG. 1 illustrates communication between applications on Host A 10 and Host B 50 at the application layer level using application protocol 15, through TCP/IP layers. Data from Host A 10, passes through the application layer an down through transport layer 20, network, layer 25, data link layer 40, and physical layer 45 before being physically transmitted to Host B 50. At Host B, the data makes its way up through the layers before being delivered to the receiving application. Physical layer 45 is concerned with the electrical characteristics of the physical transmission medium needed to transmit and receive bit patterns. Data link layer 40 typically breaks up the input data into data frames and assures error free communication to network layer 25. At Network Layer 25 TCP/IP provides Internet Protocol ("IP") 30 to move data between hosts. IP requires each host to have a unique identifying 32-bit internet address, which is used to communicate with the host. The internet address is generally expressed as X.X.X.X, where X is an 8-bit quantity.

The Address Resolution Protocol ("ARP") 35 and the Reverse Address Resolution Protocol ("RARP") 37 offer special services to aid IP in performing its functions. ARP provides mechanisms to translate internet addresses into hardware addresses, while RARP provides a method to translate hardware addresses into network addresses. ARP requests generally broadcast an IP address to all nodes, and the node whose IP address matches that in the request replies with its hardware address. On the other hand, in a RARP request, a node sends out its physical address and a server responds to the RARP request by returning the node's internet address. Physical address information for a host is correlated with its internet address and stored in a table that is used to route information to and from the host.

The purpose of the Transport layer, which provides Transmission Control Protocol 20 is to provide transparent transfer of data between end users, obviating the need for upper layers to concern themselves with the mechanics of providing such reliable and cost-effective data transfer. Finally, Application Protocol 15 ensures that data is formatted in a manner appropriate for communication to the receiving application layer. The application layer allows files and messages to be transferred between dissimilar hosts, such as exemplary hosts A and B, as shown in FIG. 1.

Figure 2:
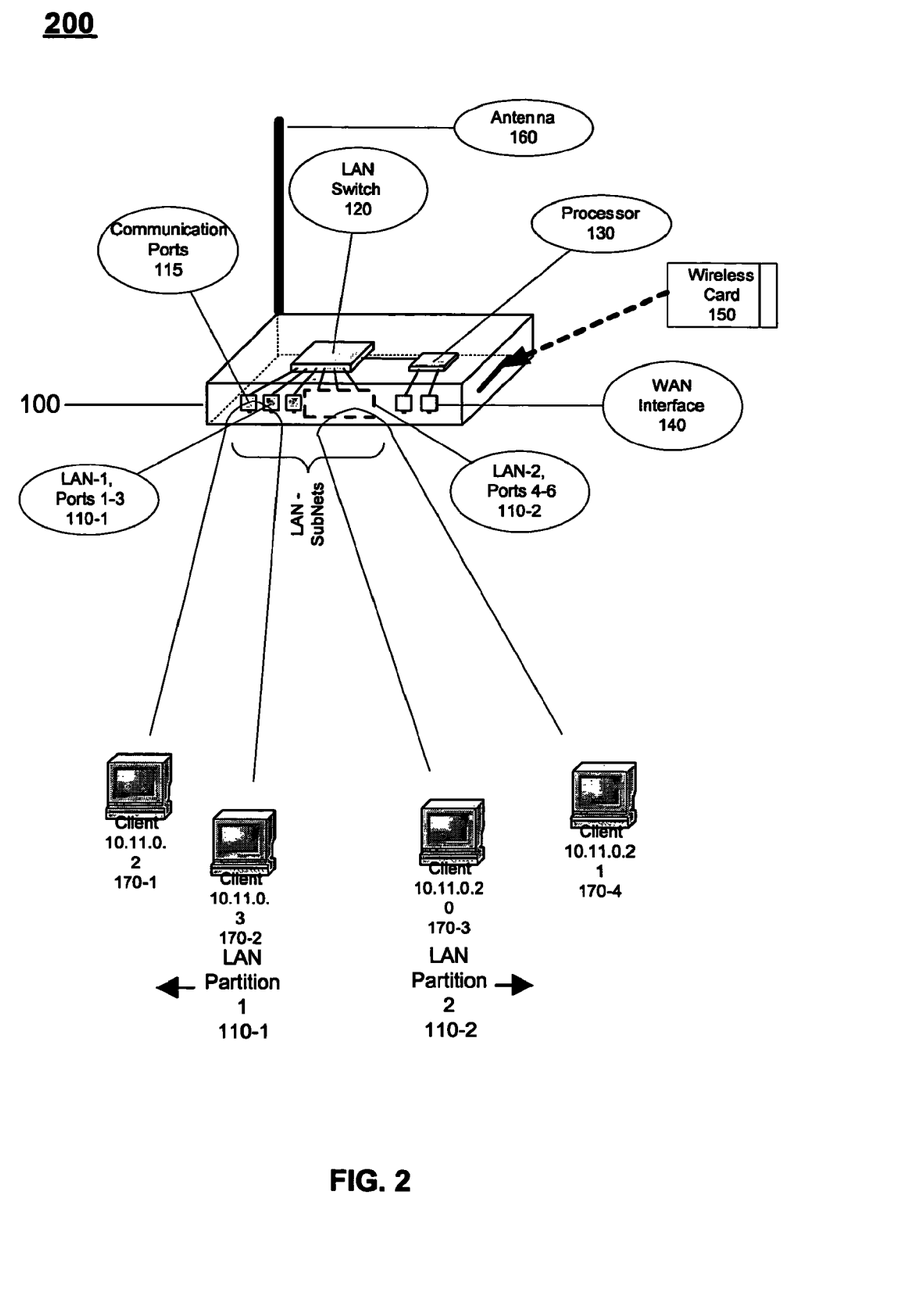
FIG. 2 illustrates an exemplary standalone network switching device connected to clients partitioned into VLAN groups according to some embodiments of the invention.

FIG. 2 illustrates an exemplary standalone network switching device 100 connected to clients 170-1 through 170-4 according to embodiments of the invention. In some embodiments, the clients could be additional instances of network switching devices 100. Exemplary network switching device 100 can be a wired and/or wireless network switching device and contains LAN ports 1-6, 115 separated into two VLAN groups 110-1 and 110-2 comprising ports 1-3 and 4-6 respectively. In general, the number of ports on a network switching device may vary as a function of switch capability, and LAN ports on the device may be assembled arbitrarily into a number of groups. Ports 1-6 may be Ethernet 10/100, Gigabit Ethernet, DSL, Cable, ISDN, ATM, Fibre Channel, or any other type of communication port according to embodiments of the invention. The ports are connected to a LAN switch 120, which controls communication ports 115 of the LAN interface, and allows ports 115 to be configured into VLAN groups 110-1 and 110-2. In some embodiments, switch 120 may also have a port reserved for the communication with processor 130 of the unit.

Processor 130 may be a general purpose, CPU, a network processor, an embedded processor, or other specially designed processor according to embodiments of the present invention. Processor 130 may execute software stored in memory (not shown). In some embodiments, the memory may be resident on network switching device 100. In some embodiments a portion of the memory may be external to processor 130. In some embodiments, memory types may include PROM, ROM, flash memory, RAM, Non-Volatile RAM, or some combination of memory device types according to embodiments of the invention. In some embodiments a portion of the memory may be a high-speed cache memory. In some embodiments, software executed by the processor may allow the device to be reconfigured, for example, by assigning or reassigning ports to groups, and/or updating firmware, and/or executing packet routing and processing algorithms. Processor 130 is connected to WAN interface 140. In general, processor 130 may also support other interfaces such as a serial port, USB ports and/or other conventional data ports. The WAN interface 140 of exemplary network switching device 100 allows communication with the WAN. Data may be sent from LAN to WAN or vice versa using processor 130. The number of WAN ports in a network switching device is a function of the capacity of processor and is fixed for a given unit. Two WAN ports are depicted in exemplary unit 100 shown in FIG. 2.

Network switching device 100 may also contain a PCM-CIA or similar slot to insert a removable wireless networking card 150, to provide wireless networking capabilities to the unit through antenna 160. In some embodiments consistent with the present invention, the wireless networking function may be integrated into the network switching device and may not require a removable card. The wireless networking card may allow network switching device 100 to support the IEEE 802.11b and/or IEEE 802.11g and/or other wireless networking protocols according to embodiments of the invention, and serve as a Wireless Access Point (WAP). In some embodiments, by using the WAP feature, the unit may be able to communicate with wireless hosts including laptops, workstations, or handheld devices using antenna 160 and provide networking capabilities to these wireless clients. Some or all of these clients could be clients 170-1 through 170-4, as shown in FIG. 2. Data received from the clients over the wired and wireless connections is sent to switch 120, at which it is processed initially. In some embodiments, data communicated over the wireless connection may be encrypted and may require decryption by the recipient. In some embodiments, data transmitted using the wireless connection may be encrypted based on the Wireless Encryption Protocol (WEP), or other encryption schemes.

Exemplary LAN Partition 1 110-1 consists of clients 170-1 and 170-2, while exemplary LAN Partition 2 110-2 consists of clients 170-3 and 170-4, as shown in FIG. 2. Communication between clients 170-1 and 170-2 may take place across switch 120. Switch 120 also enables communication between clients 170-3 and 170-4 on LAN Partition 2. Switch 120 relays data between clients on the same partition or subnet. In some embodiments, switch 120 can associate a packet with a specific VLAN group using a look-up table of hosts. In some embodiments, an identifying tag may be added to packets to indicate VLAN membership to switch 120. In the exemplary networking scheme 200 as shown in FIG. 2, port groups 110-1 and 110-2 are segmented. When communicating with a VLAN group, switch 120 knows of ports available within that port grouping. Thus, when communication arrives on a port belonging to a LAN partition (or VLAN group), the switch routes traffic within that partition. Packets that switch 120 is unable to route are sent to processor 130. Therefore, any attempt at communication from a client within a LAN partition with a client outside the same LAN partition is sent to processor 130 by switch 120. For example, communication between any of the clients and end stations connected to the external WAN interface 140 is routed through processor 130. Communication from LAN partition 1 to LAN partition 2 also requires the intervention of processor 130.

Figure 3:
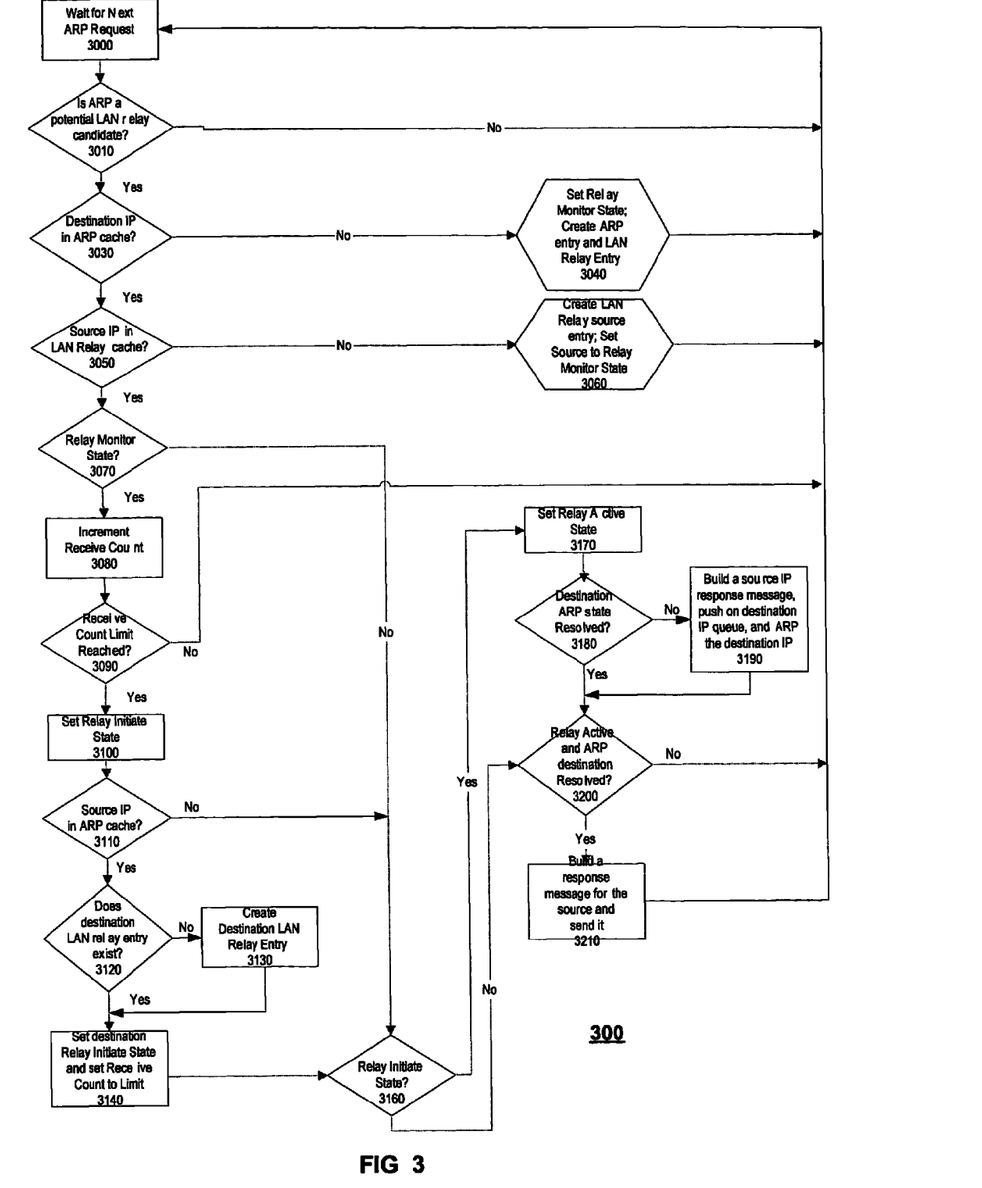
FIG. 3 depicts a flowchart with steps in a method for communication across LAN groups according to some embodiments of the invention.

FIG. 3 depicts a flowchart 300 with steps in a method for enabling communication between VLAN groups through modifications and enhancements in the Address Resolution Protocol (ARP) 35 in FIG. 1, in a manner transparent to external devices. In some embodiments, the method may be applied to equivalents of the ARP that may be present in future versions of IP, such as IPv6, for example. In some embodiments, processor 130 may execute steps in the algorithm of FIG. 3. ARP provides mechanisms to translate internet addresses into hardware addresses. In some embodiments, for example, on an Ethernet network, an IP address could serve as the internet address and a MAC address may be used as the physical address. In an Ethernet network, for example, the MAC address information of a destination is required in order for a source to initiate communication with that destination. In ARP, over Ethernet, a source broadcasts an IP address and a destination whose IP address matches the transmitted IP address responds with its MAC address. Responses to ARP requests may be used to build a host table, termed an ARP cache, which correlates IP addresses with MAC addresses. However, with VLAN groups, a broadcast domain is restricted to the VLAN group, therefore the ARP broadcast message from a source on a VLAN group will not reach destinations belonging to a different VLAN group. Accordingly, in some embodiments, network switching device 100 may use the method in the flowchart shown in FIG. 3, to determine whether the ARP broadcast message should be relayed to other VLAN groups in order to obtain destination MAC address information and enable communication between clients in the VLAN groups, such as between exemplary clients 170-1 and 170-3 in VLAN groups 110-1 and 110-2 respectively.

A response to an ARP Request only occurs when a destination recognizes that the IP address in the request matches its own. In some embodiments, the relaying of messages between the LANs ("LAN Relay") uses the lack of a response to an ARP request to decide if and when a LAN Relay should be commenced. In some embodiments, network switching device 100 uses ARP parameters such as the number of times an ARP Request has been retried and/or an ARP Request's "Time to Live" to determine that no response has been received and that the ARP Request is ripe to relay to a neighboring VLAN group.

In some implementations, steps in the flowchart of FIG. 3 may be executed by processor 130 of FIG. 2. In some implementations, steps in a method to facilitate communication between VLAN groups include the use of counters and monitoring flags to transition an ARP Request that is a LAN Relay candidate, between three LAN Relay states: a Relay Monitor State, where the ARP requests are monitored to decide if the requests should be relayed; a Relay Initiate State, where the decision to relay an ARP request has been made and parameters and tables necessary to establish communication are being finalized; and a Relay Active State, where packets will be relayed by the network switching device based on previously collected stored information.

In step 3000, an ARP Request message is awaited, and processor 130 is a wait state awaiting an ARP request. Extensions and enhancements are added to the handling of ARP Request messages to manage the LAN Relay mechanism according to embodiments of the invention, as shown in FIG. 3. Any other messages that do not require LAN relay are handled by standard processing, or are dropped in accordance with existing protocols.

In step 3010, the ARP request is examined to determine if the message is a potential LAN relay candidate. An ARP Request is a relay candidate if it meets certain criteria. For example, the destination IP address and the network switching device, such as exemplary network switching device 100, should be on the same subnet, and the network switching device should not be the target of the request. Additionally, the ARP request may be examined, for example to determine if the source and destination IP addresses are different, and to check whether the source IP address and the destination MAC address are non-zero. In some embodiments, additional constraints may be applied that may be application specific or based on the functionality of the appliance. For example, additional constraints may be applied to wireless applications running on the network appliance. If the ARP request is not a LAN Relay candidate, the process returns to step 3000, where it awaits the next incoming ARP request.

If the ARP request is a LAN relay candidate then in step 3030, the ARP cache on a host network appliance, such as exemplary network appliance 100, is examined for the destination IP. If the host unit has previously established communication with the destination IP contained in the client's ARP request, then the ARP cache will contain the destination IP and the process moves to step 3050. If there has been no prior communication with the destination IP contained in the client ARP request then, in step 3040, the ARP cache is updated with a new ARP Entry. Additionally, a LAN Relay entry is also created to represent the client requesting the communication. The next ARP request is then awaited in step 3000. If there has been no prior communication with the destination IP contained in the client ARP request, then the current state for the destination is set to a "Relay Monitor" state, in step 3040.

In some implementations, the ARP Entry fields include information pertaining to the destination of the ARP Request such as: the destination IP address of the ARP Request; an ARP State, which is set initially to "Pending" to indicate that additional ARP Requests are awaited; a Time to Live field, which indicates the time remaining for the ARP request to expire. In some implementations, a Retry Count field, which counts the number of times the ARP Request has been retried and a Release Delay Interval counter which is decremented to zero from a predefined configurable quantity each time the ARP Request has exceeded its time to live, are also used. In some implementations, a maximum Retry Count and Release Delay Interval counter may be set individually to default values that may be changed by a user based on network parameters. The process flow for pending ARP requests according to embodiments of the invention is depicted in more detail in FIG. 4.

If the destination IP address exists in the ARP cache then, in step 3050, the LAN Relay cache is checked to see whether it contains the client's i.e. the source IP address. For a destination IP address in the ARP cache, a source IP entry is created in the LAN Relay table if prior LAN Relay requests have been processed and entered into the table. The process then returns to step 3000, where the next ARP request is awaited.

In step 3060, if the source IP address did not previously exist in the LAN Relay Cache, a LAN Relay source IP address entry is created and the LAN relay state associated with the source is set to the Relay Monitor state.

The LAN Relay entry fields contain information pertaining to the source of the ARP Request such as: a Relay IP address, which is the Source IP address for ARP request and identifies the client requesting the communication; a LAN Relay State which is set to a "Monitor State" to indicate that the unit is waiting for an additional request; a Receive Counter, set initially to 1, which indicates the number of ARP requests received from a client pertaining to a destination; and a Time-To-Live entry, set to a predefined configurable quantity, which represents length of time the entry remains in the table before being cleared. Using the source IP address stored in the LAN Relay cache and the destination IP addresses, stored in the ARP cache, a request can be uniquely identified and correlated with subsequent messages.

In step 3070, if an entry for the destination IP exists in the ARP cache and an entry for the source IP exists in the LAN Relay table, then the current state of the LAN Relay entry pertaining to the request is checked. If the LAN Relay entry suggests that the request is being monitored for possible LAN Relay i.e. that it is in a "Relay Monitor" state, then in step 3080, the Receive Count counter is incremented. The Receive Count counter keeps track of the number of ARP requests received from a source for a given destination. In step 3090, if the Receive Counter meets or exceeds a Receive Count Limit then the LAN Relay entry corresponding to the ARP request is transitioned to a Relay Initiate state in step 3100. In some embodiments, the Receive Count Limit may set to a default value and/or may be configured by a user based on network parameters. If the Receive Count Limit has not been exceeded then the process returns to step 3000, where the next ARP request is awaited.

In the Relay Initiate State, exemplary network switching device 100 attempts to establish a reverse communication channel from destination to source. Setting up a reverse communication path requires establishing an entry for the destination in the LAN Relay cache and an entry for the source in the ARP Cache. Establishing the reverse channel at this time eliminates the need to monitor requests to establish a LAN Relay in the reverse direction. Therefore, when the destination client attempts communication with the source, there is no delay in the request.

In step 3110, the ARP cache is checked to determine whether it contains an entry for the source IP address. If the source IP address exists in the ARP cache, then in step 3120, the LAN Relay cache is checked for a destination IP address entry.

In step 3130, if the destination IP is not in the LAN Relay cache, a new LAN Relay entry is created using the destination IP and is set to the Relay Monitor state. The Receive Count counter, Time to Live and other entries are also appropriately initialized.

If the destination IP is in the LAN Relay cache, the entry pertaining to the destination IP is set to the Relay Initiate state and its receive count is set to the Receive Count limit in step 3140.

In step 3160, the forward communication path LAN Relay entry is checked to determine if it is in the Relay Initiate State, indicating that application is ready to attempt communication with the destination client and setup the LAN Relay to the destination. Accordingly, in step 3170, if the LAN Relay entry is in the Relay Initiate State, it is transitioned to an Active State. An Active State in a LAN Relay entry implies that all the prerequisites needed to physically attempt LAN relay are in place.

At this stage, although the network switching device 100 and specifically processor 130 may have enough information to initiate communication, no actual communication between the source and destination may have taken place. When actual communication has taken place with a destination client i.e. a request has been sent and a response received then the ARP cache entry for the destination client is transitioned to a resolved state. In step 3180, the ARP cache is checked to determine if the ARP cache entry corresponding to the destination IP address is in a Resolved State.

If the destination IP address entry in the ARP cache is not in a resolved state then, in step 3190, standard ARP protocol may be used to resolve the communication. Accordingly, in some embodiments, a standard ARP request is sent to the destination client by processor 130. In some embodiments, processor 130 may also build a response message to the source of the ARP request and push this onto a queue associated with the destination IP.

In step 3200, a check is performed to see if the LAN Relay is in the Active State and the ARP cache entry destination IP is in the Resolved State. When both of these conditions are met, the LAN Relay link has been established and communication across the link can proceed. Otherwise, the link is not yet established but is in the process of being established. If the destination client responds to the ARP request that was sent by processor 130, in step 3190, then the destination IP address entry in the ARP cache may be marked as resolved. Accordingly, the response message previously built by processor 130 and placed on the queue associated with the destination IP can be sent to the source in step 3210. Exemplary processor 130 can now relay or proxy messages between clients in VLAN groups 110-1 and 110-2. In some embodiments, if the destination client never responds, the ARP eventually times out and all requests are cleared off the queue. In some embodiments, once an ARP entry is resolved and the LAN Relay activated, network switching device 100 responds to all further communication requests between the VLAN groups, acting as a relay agent.

Figure 4:
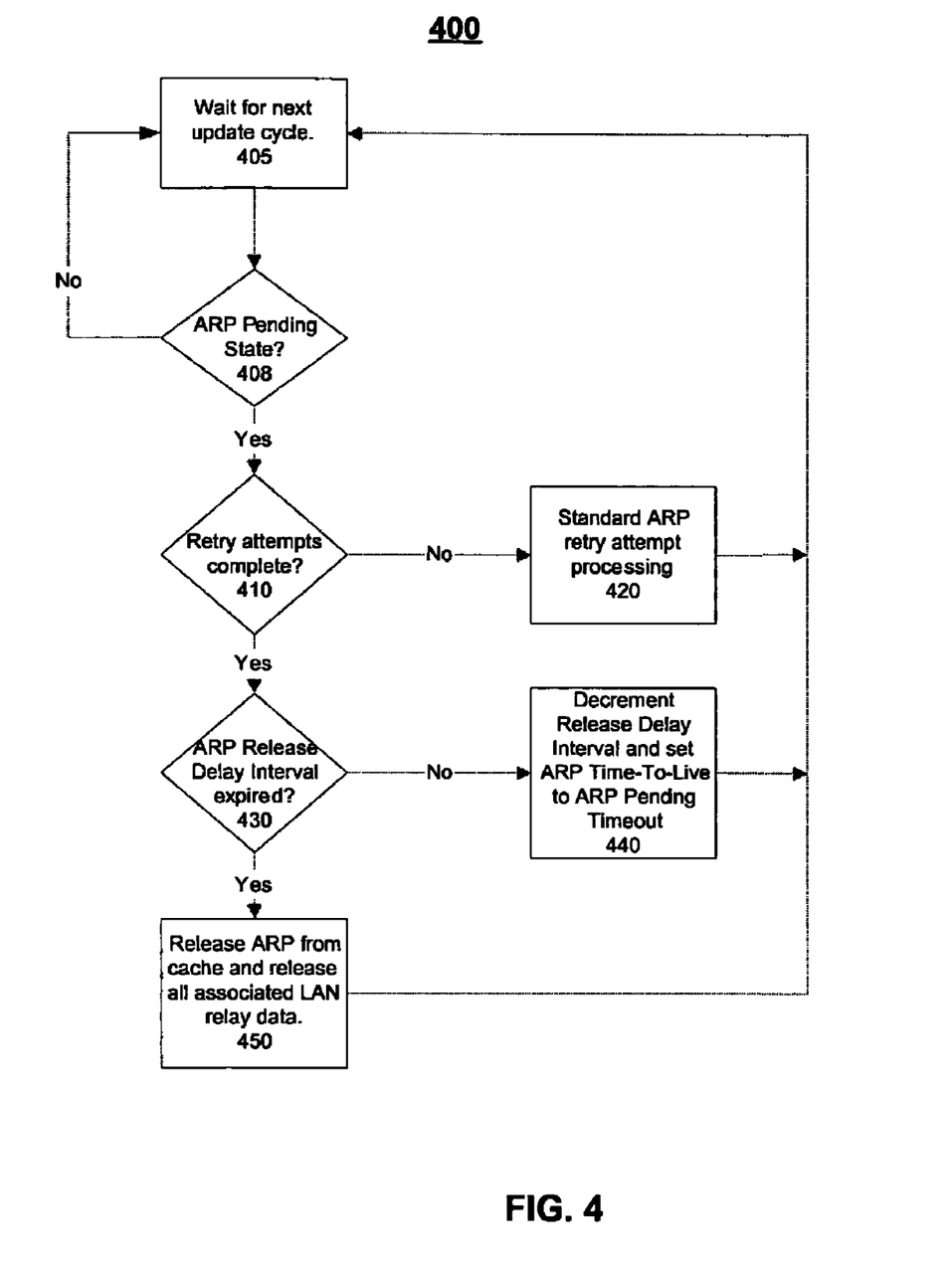
FIG. 4 depicts the process flow for pending ARP requests according to some embodiments of the invention.

FIG. 4 depicts the process flow 400 for pending ARP requests according to some embodiments of the invention. In some embodiments, processor 130 may perform the method of FIG. 4. In step 405, the start of a new update cycle is awaited, at which point the process repeats. The ARP Pending mechanism is updated at pre-defined intervals (typically one second) according to standard ARP protocol.

In step 408, the ARP Request is in an ARP Pending state, which is the standard ARP protocol Pending State during attempted communication with a destination client. Extensions are added to the standard ARP protocol pertaining to this state, according to embodiments of the invention.

In step 410, a check is performed to determine if the standard ARP retry sequence is complete. If the retry sequence has not completed then an additional retry attempts is made, in step 420, following standard ARP protocol. The process then returns to step 405, where the start of a new update cycle is awaited.

In step 430, the ARP Release Delay Interval counter is checked for expiry. The ARP Release Delay Interval counter allows the life of ARP cache entries to be prolonged even after the completion of the standard ARP retry sequence. In some embodiments, some or all of the clients 170-1 through 170-4 of a host unit may themselves be additional embodiments of network switching device 100. In such situations, ARP requests sent by the main host unit 100 may be echoed back by some of the client units 170 after the standard ARP retry sequence has completed on the main host unit. By prolonging the life of the ARP request and maintaining its pendency, any ARP Requests echoed back from client units will be ignored (since the message is already pending) thereby reducing network traffic. In some embodiments consistent with the present invention, the ARP Release Delay Interval counter is added to the standard ARP entries and is initialized to a default or user configurable quantity when a new ARP cache entry is created for a LAN Relay candidate. Otherwise, for non LAN relay candidates, it is set to zero.

In step 440, the Release Delay Interval counter is decremented and the ARP Time to Live is reset. The process then returns to step 405, where the start of a new update cycle is awaited. When the Release Delay Interval counter has decremented down to zero, the delay has expired. In step 450, both the standard ARP retry sequence and the LAN Relay delay extensions have completed indicating that the destination client is not available for communication. Accordingly, the ARP entry for the destination IP and all LAN Relay entries associated with the destination IP pertaining to that ARP cache entry are released. In some embodiments consistent with the present invention, all LAN relay entries, associated with an ARP cache entry are always released when the ARP cache entry is released.

Figure 5:
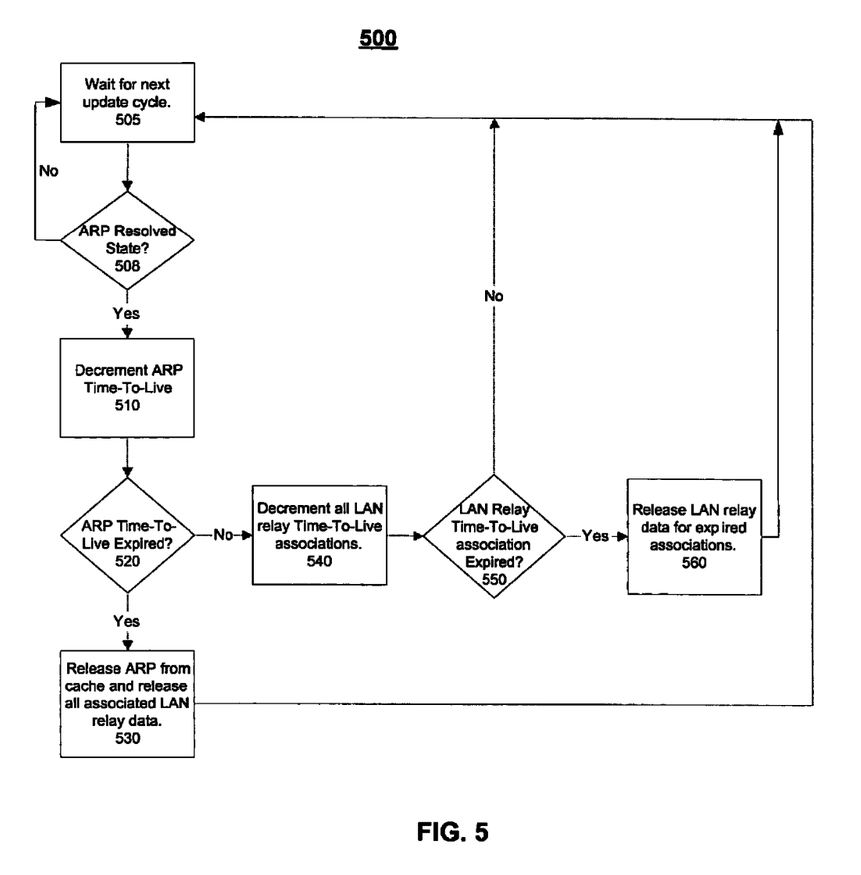
FIG. 5 depicts the process flow for releasing established LAN Relay entries associated with an ARP cache entry, according to some embodiments of the invention.

FIG. 5 depicts the process flow 500 for releasing previously established LAN Relay entries associated with an ARP cache entry, according to some embodiments of the invention. In some embodiments consistent with the present invention, the LAN Relay mechanism adds some extensions to the standard ARP protocol to expire and delete LAN relay entries separately from a corresponding ARP cache entry, when the ARP entry is in the Resolved State. In general, the expiry period is a mechanism used to clear stale and/or invalid entries from the cache(s). Entries may become invalid when hosts are moved, or other network configuration changes are made. In some embodiments, the expiry period may be configurable. In some embodiments, processor 130 may perform the method of FIG. 5.

In step 505, the start of a new update cycle is awaited, at which point the process repeats. The ARP entries are updated at pre-defined intervals according to standard ARP protocol.

In step 508, an ARP cache entry is checked to determine if it is in the Resolved State. If the entry is not in a resolved state the process returns to step 505, where a new update cycle is awaited. If an entry is in the resolved state then, in step 510, the ARP Time to Live counter is decremented in accordance with standard ARP protocol. In step 520, the ARP Time to Live is checked, in accordance with standard ARP protocol, to determine if the ARP cache entry has timed out. If the Time to Live has expired then, in step 530, the ARP entry is released from the ARP cache in conjunction with the release of all associated LAN Relay data from the LAN Relay cache.

If the ARP Time to Live counter has not expired then, in step 540, all LAN Relay Time to Live entries, associated with an ARP entry in the Resolve State, are decremented. Next, in step 550, the LAN Relay Time to Live entries, associated with an ARP entry in the Resolved State are checked to see if they have expired. In step 560, any LAN Relay entries, associated with an ARP entry in the Resolved State, are released when their Time to Live has expired. In some embodiments, LAN Relay entries may exist for only a short period of time before being released.

Figure 6:
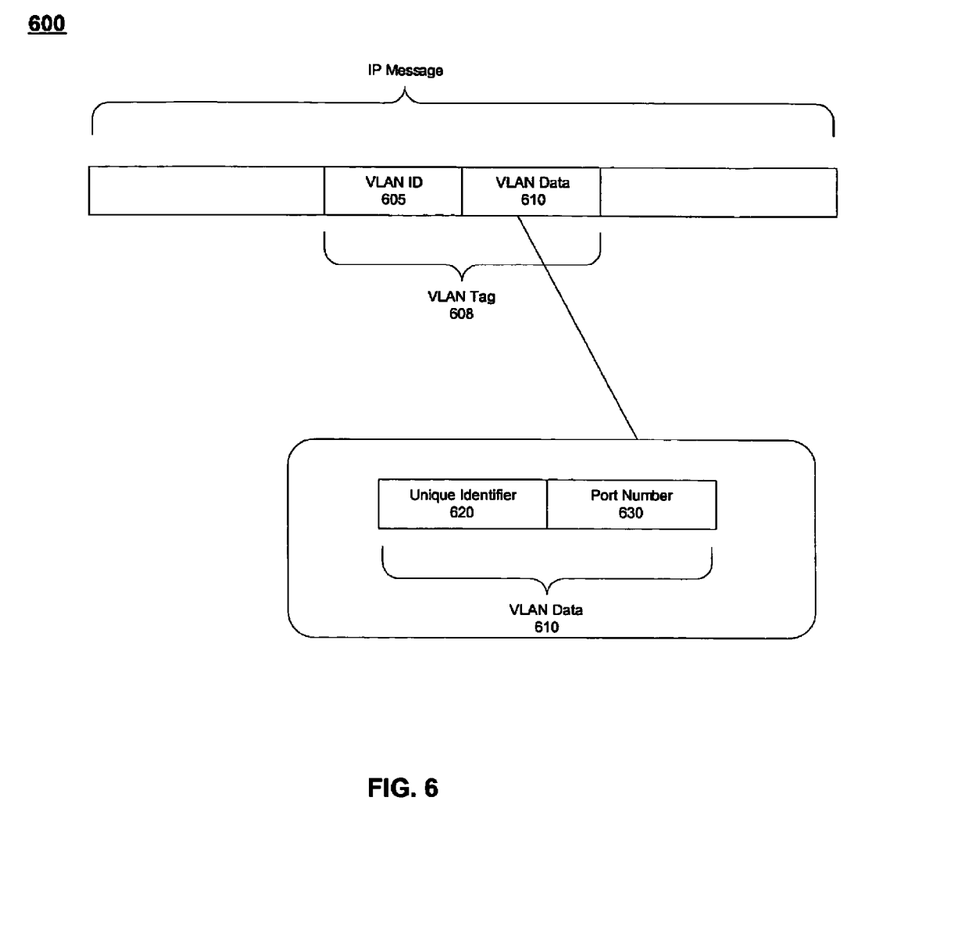
FIG. 6 shows features added to messages that may be used to enhance security according to some embodiments of the present invention.
Figure 7:
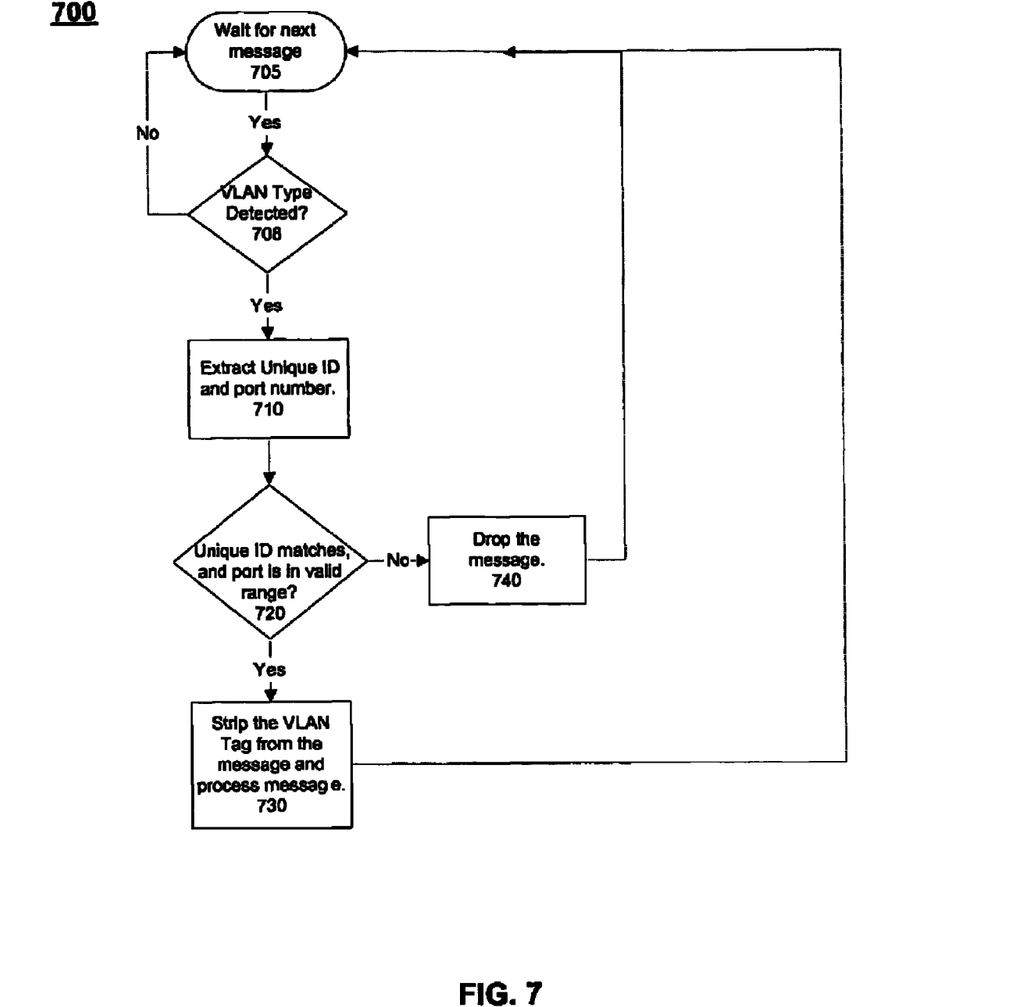
FIG. 7 depicts an algorithm with steps in a method for message flow control, according to some embodiments of the present invention.

The VLAN proxy mechanism described above determines when packets will be forwarded between VLAN groups. In some embodiments, it may be desired to have additional control over communication ports 115 in network switching device 100 to determine which packets are forwarded by processor 130. In some embodiments, such additional message flow control could be used to enhance network security by ensuring that only messages from certain ports are relayed. FIG. 6 shows features added to messages that may be used to enhance security according to embodiments of the present invention. FIG. 7 depicts an algorithm 700 with steps in a method for message flow control, using features shown in FIG. 6, according to embodiments of the present invention.

In some embodiments consistent with the present invention, a VLAN tag 608 is used to uniquely identify each port in a switch. FIG. 6 displays an exemplary format for a VLAN tag according to embodiments of the invention. FIG. 6 shows exemplary VLAN tag identifier 605 embedded in an IP message, where it indicates the presence of VLAN tag 608. In some embodiments, switch 120 may be configured to insert a VLAN tag, such as exemplary VLAN tag 608, into incoming messages to uniquely identify the port transmitting the message. In some embodiments, switch 120 may be configured to remove any incoming VLAN tags and replace it with a switch-generated tag. In some embodiments, communication ports 115 in exemplary network switching device 100 may be individually configured to insert or omit VLAN tags in transmitted messages.

VLAN tags 608 also include VLAN Data field 610, which holds the information contained in the VLAN tag. In some embodiments, the information in VLAN Data field 608 may be controlled by a user application. VLAN Data field 608 may comprise of a Unique Identifier field 620 and a Port Number field 630 according to embodiments of the invention. Port Number field 630 identifies the communication port receiving a message. In some embodiments, switch 120 may be configured with port identification information by an application. In some embodiments, the actual data in Port Number field 630 is customizable and may be configured by an application. For example, the communication ports 115 can be uniquely identified as port numbers 1 to 6 by appropriately configuring Port Number fields through switch 120. Unique Identifier field 620 can be used to validate the received VLAN tag 608 and can also be used to prevent a message from being spoofed by an external source. In some embodiments, switch 120 may have been configured to insert VLAN tags 608 in messages. In some embodiments, data in VLAN tags 608, such as exemplary VLAN data field 610 and Unique Identifier field 620 and Port Number field 630 may have been set up during the configuration of switch 120. In some embodiments, VLAN tag 608 may be contained within a received packet and can be detected by processor 130. Upon detection of the VLAN packet, processor 130 can, for example, use Unique Identifier field 620 to validate VLAN tag 608; use Port Number field 630 to determine the port information of the packet; use port configuration information associated with switch 120 to decide how the message is to be handled; and then either drop the packer or allow further communication based on the port configuration information.

FIG. 7 depicts steps in an exemplary method 700 for packet screening using VLAN tags. In some embodiments, steps in the method 700 could be performed by processor 130, or by a combination of switch 120 and processor 130. In step 705, the device waits for the next message to arrive at one of the communication ports. In step 708, a received message is checked to determine if a VLAN tag is present. Additional packet processing is performed only when a VLAN tag is present in the packet. If no tag is detected, the process returns to step 705 where the next message is awaited. If a VLAN tag is present then, in step 710, the Unique Identifier and Port Number fields are extracted from the VLAN Data field of the message. In some embodiments consistent with the present invention, the VLAN Data, Unique Identifier, and Port Number fields could be exemplary VLAN Data field 610, exemplary Unique Identifier 620 and exemplary Port Number field 630 respectively.

In step 720, the VLAN data extracted from the message is validated for correctness. The Unique Identifier should match the identifier that was configured into the switch and the port number should be within range of the available ports of the appliance. If the comparison in step 720 fails then the message is discarded in step 740.

If the comparison indicates a valid tag then, in step 730, the VLAN tag is stripped from the message and the message processed. Once the VLAN tag has been stripped, the packet can be processed and forwarded. In some embodiments, message processing may also involve filtering of the message, based on the Port Number where it was received or the message type. In some embodiments, messages received on certain ports can be filtered out completely to provide extra security features. For example, only ARP messages may be permitted on certain ports and all other messages may be dropped. In some embodiments, only traffic on certain ports will be relayed through the system. In general, the filtering of messages is application specific and can vary greatly.

Further, methods consistent with embodiments of the invention may conveniently be implemented using program modules, hardware modules, or a combination of program and hardware modules. Such modules, when executed, may perform the steps and features disclosed herein, including those disclosed with reference to the exemplary flow charts shown in the figures. The operations, stages, and procedures described above and illustrated in the accompanying drawings are sufficiently disclosed to permit one of ordinary skill in the art to practice the invention. Although, embodiments of the invention have been described with reference to certain protocols and communication standards, it should be noted that the methods described are also applicable and may be easily modified to work with other protocols and standards. For example, the method may be applied after suitable modifications to equivalents of ARP that may be appear in IPv6. Such modifications, when required, will be apparent to one of ordinary skill in the art. Moreover, there are many processors and devices that may be used in practicing embodiments of the instant invention and, therefore, no detailed program could be provided that would be applicable to these many different systems. Each user of a particular processor or device will be aware of the language, hardware, and tools that which are most useful for that user's needs and purposes.

The above-noted features and aspects of the present invention may be implemented in various environments. Such environments and related applications may be specially constructed for performing the various processes and operations of the invention, or they may include a general-purpose computer or a platform selectively activated or reconfigured by program code to provide the functionality. The processes disclosed herein are not inherently related to any particular computer or other apparatus, and aspects of these processes may be implemented by any suitable combination of hardware, software, and/or firmware. For example, various general-purpose machines may be used with programs written in accordance with teachings of the invention, or it may be more convenient to construct a specialized apparatus or system to perform the required methods and techniques.

Embodiments of the present invention also relate to compute-readable media that include program instructions or program code for performing various processor-implemented operations based on the methods and processes of embodiments of the invention. In some embodiments, program code on compute readable media may be downloaded to memory on a network switching device where it may be stored and executed by a processor. The program instructions may be those specially designed and constructed for the purposes of the invention, or they may be of the kind well known and available to those having skill in the computer software arts. Examples of program instructions include, for example, machine code, such as produced by a compiler, and files containing a high-level code that can be executed by the computer using an interpreter.

Other embodiments of the invention will be apparent to those skilled in the art from consideration of the specification and practice of the embodiments of the invention disclosed herein. It is intended that the specification and examples be considered as exemplary only, with a true scope and spirit of the invention being indicated by the following claims. As such, the invention is limited only by the following claims.

The invention claimed is:

1. A method of forwarding at least one ARP request packet between Virtual Local Area Network (VLAN) groups served by segmented ports on a network switching device on a network, the method comprising:
   determining that a source of the at least one ARP request packet is served by a port that is segmented from a port serving a destination of the request packet by,
      monitoring the status of the at least one ARP request packet;
      determining that no response to the at least one ARP request packet has been received during a time period, wherein the time period is based on a Time to Live parameter associated with the request packet; and
      keeping the at least one ARP request packet alive following the expiry of the time period by extending the Time to Live parameter;
   obtaining routing information for the destination;
   obtaining routing information for the source;
   storing routing information for the source and destination; and
   relaying the at least one ARP request between segmented ports on the device serving the source and the destination using the stored routing information.

2. The method of claim 1, wherein the network is an Ethernet network.

3. The method as in claim 1, wherein the method is performed by a processor within the network switching device.

4. The method of claim 1, wherein determining that no response to the at least one ARP request packet has been received during a time period further comprises:
   inspecting at least one packet addressed to the source; and
   checking that the inspected packet is not a response to the at least one ARP request packet.

5. The method of claim 1, wherein keeping the at least one ARP request packet alive following the expiry of the time period by extending the Time to Live parameter further comprises resetting the Time to Live parameter a finite number of times.

6. The method of claim 5, wherein the finite number of times that the Time to Live parameter may be reset is configurable.

7. The method of claim 1, wherein determining that the source of the at least one ARP request packet is served by a port that is segmented from the port serving the destination is based on an absence of destination routing information available to a component element of the network switching device where the request is first processed.

8. The method of claim 7, wherein the component element of the network switching device is a network switch.

9. The method of claim 1, wherein obtaining routing information for the destination further comprises:
    obtaining the internet address of the destination from information contained in the at least one ARP request packet;
    re-broadcasting at least one ARP request within each VLAN group that is served by ports segmented from the port serving the source;
    obtaining the physical address of the destination from information contained in an ARP response packet corresponding to the re-broadcast ARP request packet; and
    relaying the ARP response packet to the source.

10. The method of claim 9, wherein the internet address of the destination is its Internet Protocol (IP) address and the physical address of the destination is its Medium Access Control (MAC) address.

11. The method of claim 1, wherein obtaining routing information for the source further comprises obtaining the internet address and the physical address of the source using information contained in the at least one ARP request packet.

12. The method of claim 11, wherein the internet address of the source is its IP address and the physical address of the source is its MAC address.

13. The method of claim 1, wherein storing the routing information further comprises:
    storing routing information including the internet and physical addresses for the destination in a table; and
    storing routing information including the internet and physical addresses for the source in a table.

14. The method of claim 13, wherein the routing information is stored in cache memory on the network switching device.

15. The method of claim 13, wherein the physical address is a MAC address and the internet address is an IP address.

16. The method of claim 1, further comprising relaying at least one additional packet between the source and destination using the stored routing information by:
    inspecting the at least one additional packet to determine if the packet contains a VLAN tag;
    validating the VLAN tag;
    relaying the packet, if the VLAN tag is valid; and
    dropping the packet, if the VLAN tag is invalid.

17. The method of claim 16, wherein validating the VLAN tag includes:
    extracting a first Unique Identifier and a Port Number from the VLAN tag;
    matching the extracted first Unique Identifier with a second unique identifier associated with a component element of the network switching device where the at least one additional packet is first processed; and
    determining if the Port Number falls within a range of port numbers assigned to ports on the network switching device.

18. The method of claim 17, wherein the component element of the network switching device, at which the request is first processed, is a network switch.

19. A method of forwarding at least one ARP request packet between VLAN groups served by segmented ports on a network switching device, on a network comprising:
    determining that a source of the at least one ARP request packet is served by a port that is segmented from a port serving the destination by,
        monitoring the status of the at least one ARP request packet;
        determining that no response to the at least one ARP request packet has been received during a time period, wherein the time period is based on a Time to Live parameter associated with the at least one ARP request packet; and
        keeping the at least one ARP request packet alive following the expiry of the time period by extending the Time to Live parameter; and
    relaying the at least one ARP request packet between the source and destination by obtaining packet routing information for the destination and the source.

20. The method of claim 19, wherein the network is an Ethernet network.

21. The method as in claim 19, wherein the method is performed by a processor within the network switching device.

22. The method of claim 19, wherein obtaining packet routing information for the destination and the source further comprises:
    obtaining routing information for the destination;
    obtaining routing information for the source; and
    storing routing information for the source and destination.

23. The method of claim 19, wherein determining that no response to the at least one ARP request packet has been received during a time period further comprises:
    inspecting at least one packet addressed to the source;
    checking that the inspected packet is not a response to the ARP request packet.

24. The method of claim 19, wherein keeping the at least one ARP request packet alive following the expiry of the time period by extending the Time to Live parameter further comprises resetting the Time to Live parameter a finite number of times.

25. The method of claim 24, wherein the finite number of times the Time to Live parameter may be reset is configurable.

26. The method of claim 22, wherein obtaining routing information for the destination further comprises:
    obtaining the IP address of the destination from information contained in the at least one ARP request packet;
    re-broadcasting at least one ARP request within each VLAN group that is served by ports segmented from the port serving the source; and
    obtaining the MAC address of the destination from the information contained in an ARP response packet corresponding to the at least one ARP re-broadcast request; and
    relaying the ARP response packet to the source.

27. The method of claim 22, wherein obtaining routing information for the source further comprises obtaining the IP address and the MAC address of the source using information contained in the at least one ARP request packet.

28. The method of claim 22, wherein storing the routing information further comprises:
    storing routing information including the IP and MAC addresses for the destination in a table; and storing routing information including the IP and MAC addresses for the source in a table.

29. The method of claim 28, wherein the routing information is stored in cache memory on the network switching device.

30. The method of claim 19, wherein determining that the source of the at least one ARP request packet is served by a port that is segmented from the port serving the destination is based on an absence of destination routing information available to a component element of the network switching device where the request is first processed.

31. The method of claim 30, wherein the component element is a network switch.

32. The method of claim 19, further comprising relaying at least one additional packet between the source and destination by:
inspecting at least one packet to determine if the packet contains a VLAN tag;
validating the VLAN tag;
relaying the packet, if the VLAN tag is valid; and
dropping the packet, if the VLAN tag is invalid.

33. The method of claim 32, wherein validating the VLAN tag includes:
extracting a first Unique Identifier and a Port Number from the VLAN tag;
matching the first Unique Identifier with a second unique identifier associated with a component element of the network switching device where the at least one additional packet is first processed; and
determining if the Port Number falls within the range of port numbers assigned to ports on the network switching device.

34. The method of claim 33, wherein the component element is a network switch.

35. A system for forwarding at least one request packet between a source and a destination belonging to two distinct VLAN groups on a network switching device wherein the system is configured to perform a method comprising the steps of:
determining that the source of the at least one ARP request packet and the destination of the at least one ARP request packet belong to two distinct VLAN groups by,
monitoring the status of the at least one ARP request packet;
determining that no response to the at least one ARP request packet has been received during a time period, wherein the time period is based on a Time-to-Live parameter associated with the at least one ARP request packet; and
keeping the at least one ARP request packet alive following the expiry of the time period by extending the Time-to-Live parameter; and
relaying the at least one at least one ARP request packet between the source and destination by obtaining packet routing information for the destination and the source.

36. The system of claim 35, wherein keeping the at least one ARP request packet alive following the expiry of the time period by extending the Time-to-Live parameter further comprises resetting the Time-to-Live parameter a finite number of times.

37. The system of claim 35, wherein obtaining routing information for the destination further comprises:
obtaining the internet address of the destination from the at least one ARP request packet;
re-broadcasting at least one ARP request within each VLAN group that does not include the source; and receiving a response packet corresponding to the at least one ARP re-broadcast request;
obtaining the physical address of the destination from the received response packet; and
relaying the response packet to the source.

38. The system of claim 35, further comprising relaying at least one additional packet between the source and destination by:
determining the presence of a VLAN tag in the packet;
validating the VLAN tag;
relaying the packet, if the VLAN tag is valid; and
dropping the packet, if the VLAN tag is invalid.

39. The system of claim 38, wherein validating the VLAN tag further comprises:
extracting a first Unique Identifier and a Port Number from the VLAN tag;
comparing the first Unique Identifier with a second unique identifier associated with a component element of the network switching device where the request is first processed; and
determining if the Port Number falls within the range of port numbers assigned to ports on the network switching device; and
indicating the validity of the tag.

40. A system for forwarding at least one ARP request packet between a source and a destination belonging to two distinct VLAN groups on a network switching device wherein the system is configured to perform a method comprising the steps of:
determining that a source of the at least one ARP request packet and a destination of the ARP request belong to two distinct VLAN groups by
monitoring the status of the at least one ARP request packet;
determining that no response to the at least one ARP request packet has been received during a time period, wherein the time period is based on a Time to Live parameter associated with the at least one ARP request packet; and
keeping the at least one ARP request packet alive following the expiry of the time period by extending the Time to Live parameter; and
obtaining routing information for the destination;
obtaining routing information for the source;
storing the routing information to the source and destination; and
relaying the at least one ARP request packet between the source and destination using the stored routing information.

41. The system of claim 40, wherein determining that no response to the at least one ARP request packet has been received during the time period further comprises:
inspecting at least one packet addressed to the source;
checking that the inspected packet is not a response to the ARP request.

42. The system of claim 40, wherein keeping the at least one ARP request packet alive following the expiry of the time period by extending the Time to Live parameter further comprises resetting the Time to Live parameter a finite number of times.

43. The system of claim 40, wherein obtaining routing information for the destination further comprises:
obtaining the IP address of the destination from information contained in the at least one ARP request packet;
re-broadcasting the at least one ARP request packet within each VLAN group that does not include the source;

receiving an ARP response packet corresponding to the re-broadcast ARP request packet;

obtaining the MAC address of the destination from the received ARP response packet; and relaying the ARP response packet to the source.

44. The system of claim 40, wherein obtaining routing information for the source further comprises means for obtaining the IP address and the MAC address of the source using information contained in the ARP request.

45. The system of claim 40, wherein means for storing the routing information further comprises:

means for storing routing information, including the IP and MAC addresses, for the destination, in a table; and means for storing routing information, including the IP and MAC addresses, for the source, in a table.

46. The system of claim 40, further comprising relaying at least one additional packet between the source and destination by:

inspecting the at least one additional packet to determine if the at least one additional packet contains a VLAN tag;

validating the VLAN tag;

relaying the at least one additional packet, if the VLAN tag is valid; and dropping the at least one additional packet, if the VLAN tag is invalid.

47. The system of claim 46, wherein validating the VLAN tag includes:

extracting a first Unique Identifier and a Port Number from the VLAN tag;

comparing the first Unique Identifier with a second unique identifier associated with a component element of the network switching device, at which the request is first processed;

determining if the Port Number falls within the range of port numbers assigned to ports on the network switching device; and indicating the validity of the VLAN tag.

48. A computer-readable medium that stores instructions, which when executed by a processor perform steps in a method for forwarding at least one ARP request packet between Virtual Local Area Network (VLAN) groups served by segmented ports on a network switching device on a network, the steps comprising:

determining that a source of the at least one ARP request packet is served by a port that is segmented from a port serving the destination of the at least one ARP request packet by, monitoring the status of the at least one ARP request packet;

determining that no response to the at least one ARP request packet has been received during a time period, wherein the time period is based on a Time to Live parameter associated with the at least one ARP request packet; and keeping the at least one ARP request packet alive following the expiry of the time period by extending the Time to Live parameter;

obtaining routing information for the destination;

obtaining routing information for the source;

storing the routing information; and relaying the at least one ARP request packet between the segmented ports on the device serving the source and destination using the stored routing information.

49. A computer readable memory containing instructions for controlling a processor to perform steps in a method for forwarding at least one ARP request packet between Virtual Local Area Network (VLAN) groups served by segmented ports on a network switching device on a network, the steps comprising:

determining that a source of the at least one ARP request packet is served by a port that is segmented from the port serving a destination of the at least one ARP request packet by, monitoring the status of the at least one ARP request packet;

determining that no response to the at least one ARP request packet has been received during a time period, wherein the time period is based on a Time to Live parameter associated with the at least one ARP request packet; and keeping the at least one ARP request packet alive following the expiry of the time period by extending the Time to Live parameter;

obtaining routing information for the destination;

obtaining routing information for the source;

storing the routing information; and relaying the at least one ARP request packet between the segmented ports on the device serving the source and destination using the stored routing information.

50. A system configured to forward at least one ARP request packet between Virtual Local Area Network (VLAN) groups served by segmented ports on a network switching device on a network, the system comprising:

a component capable of controlling ports on the network switching device, and exchanging information over the network through the ports;

a processor coupled to the component for controlling ports capable of exchanging data and control information with the component; and a memory coupled to the processor, wherein the component for controlling ports, the processor, and the memory are configured to perform a method comprising:

determining that a source of the at least one ARP request packet is served by a port that is segmented from the port serving a destination of the at least one ARP request packet by, monitoring the status of the request;

determining that no response to the at least one ARP request has been received during a time period, wherein the time period is based on a Time to Live parameter associated with the at least one ARP request packet; and keeping the at least one ARP request packet alive following the expiry of the time period by extending the Time to Live parameter;

obtaining routing information for the destination;

obtaining routing information for the source;

storing the routing information; and relaying the at least one ARP request packet between the segmented ports on the device serving the source and destination using the stored routing information.

* * * * *